United States Patent
Ryu et al.

(10) Patent No.: US 10,228,501 B2
(45) Date of Patent: Mar. 12, 2019

(54) METHOD FOR MANUFACTURING POLARIZER, AND POLARIZER AND POLARIZING PLATE MANUFACTURED USING SAME

(71) Applicant: LG CHEM, LTD., Seoul (KR)

(72) Inventors: Jae Il Ryu, Daejeon (KR); Eung Jin Jang, Daejeon (KR); Jin Yong Park, Daejeon (KR); Eungki Lee, Daejeon (KR); Hyung Koo Kang, Daejeon (KR); Taek Geun Nam, Daejeon (KR); Deok Woo Park, Daejeon (KR); Young Gon Kim, Daejeon (KR); Yeon Soo Kim, Daejeon (KR); You Kyeong Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/510,495

(22) PCT Filed: Sep. 21, 2015

(86) PCT No.: PCT/KR2015/009878
§ 371 (c)(1),
(2) Date: Mar. 10, 2017

(87) PCT Pub. No.: WO2016/052895
PCT Pub. Date: Apr. 7, 2016

(65) Prior Publication Data
US 2017/0285236 A1    Oct. 5, 2017

(30) Foreign Application Priority Data

Sep. 29, 2014 (KR) .......................... 10-2014-0130582

(51) Int. Cl.
*G02B 5/30* (2006.01)
*B32B 27/30* (2006.01)
(Continued)

(52) U.S. Cl.
CPC .......... *G02B 5/3025* (2013.01); *B29C 55/005* (2013.01); *B29C 55/02* (2013.01);
(Continued)

(58) Field of Classification Search
CPC .. G02B 5/3025; G02B 1/14; B29D 11/00644; B32B 27/30; B32B 2307/42; C08J 5/18;
(Continued)

(56) References Cited

U.S. PATENT DOCUMENTS

2006/0092350 A1* 5/2006 Nishkoji ........... G02F 1/133514
349/106
2007/0146882 A1* 6/2007 Yoshioka ............. G02B 5/3008
359/487.02
(Continued)

FOREIGN PATENT DOCUMENTS

CN     103765259 A    4/2014
JP     2005-049698 A  2/2005
(Continued)

OTHER PUBLICATIONS

Machine Translation (1) of KR20140020064A from Google Translation Services: https://patents.google.com/patent/KR20140020064A/en, performed on May 15, 2018.*
(Continued)

*Primary Examiner* — Frank G Font
(74) *Attorney, Agent, or Firm* — Dentons US LLP

(57) ABSTRACT

The present invention relates to a method for manufacturing a polarizer, including: a) immersing and swelling a polyvinyl alcohol-based film in an aqueous solution containing an azo-based dye having an absorption wavelength of 300 nm to 550 nm; b) dyeing the swollen polyvinyl alcohol-based film with an iodine-based dye; and c) stretching the dyed polyvinyl alcohol-based film, and a polarizer manufactured using the method.

12 Claims, 1 Drawing Sheet

(51) Int. Cl.
*C09B 67/36* (2006.01)
*C08J 5/18* (2006.01)
*C09B 67/02* (2006.01)
*B29D 11/00* (2006.01)
*G02B 1/14* (2015.01)
*B29C 55/02* (2006.01)
*B29C 55/00* (2006.01)
*B29K 29/00* (2006.01)

(52) U.S. Cl.
CPC ........ *B29D 11/00644* (2013.01); *B32B 27/30* (2013.01); *C08J 5/18* (2013.01); *C09B 67/0079* (2013.01); *C09B 67/0097* (2013.01); *G02B 1/14* (2015.01); *G02B 5/3033* (2013.01); *B29K 2029/04* (2013.01); *B32B 2307/42* (2013.01); *C08J 2329/04* (2013.01)

(58) Field of Classification Search
CPC .............. C08J 2329/04; C09B 67/0079; C09B 67/0097; B29C 55/02; B29K 2029/04
USPC .......................................... 359/487.02; 349/96
See application file for complete search history.

(56) References Cited

U.S. PATENT DOCUMENTS

| | | | |
|---|---|---|---|
| 2007/0188686 A1* | 8/2007 | Yano | G02B 27/281 349/119 |
| 2008/0170184 A1 | 7/2008 | Byun et al. | |
| 2009/0237786 A1* | 9/2009 | Yoshihara | G02B 1/105 359/485.01 |
| 2012/0224126 A1* | 9/2012 | Chang | G02B 5/3016 349/117 |
| 2012/0301696 A1* | 11/2012 | Watanabe | C08J 5/18 428/220 |
| 2014/0036175 A1* | 2/2014 | Morishima | G02B 5/3016 349/15 |
| 2014/0204460 A1* | 7/2014 | Nam | G02B 5/3083 359/489.07 |

FOREIGN PATENT DOCUMENTS

| | | |
|---|---|---|
| JP | 2006-350062 A | 12/2006 |
| JP | 2007298540 A | 11/2007 |
| JP | 2008-102246 A | 5/2008 |
| JP | 2008-151903 A | 7/2008 |
| JP | 2011-053234 A | 3/2011 |
| KR | 10-2006-0084168 A | 7/2006 |
| KR | 10-2008-0067142 A | 7/2008 |
| KR | 10-2013-0072048 A | 7/2013 |
| KR | 10-2014-0020064 A | 2/2014 |

OTHER PUBLICATIONS

Machine Translation (2) of KR20140020064A from Espacenet Patent Search (European Patent Office): https://worldwide.espacenet.com/publicationDetails/biblio?II=1&ND=3&adjacent=true&locale=en_EP&FT=D&date=20140218&CC=KR&NR=20140020064A&KC=A#, performed on May 15, 2018.*

* cited by examiner

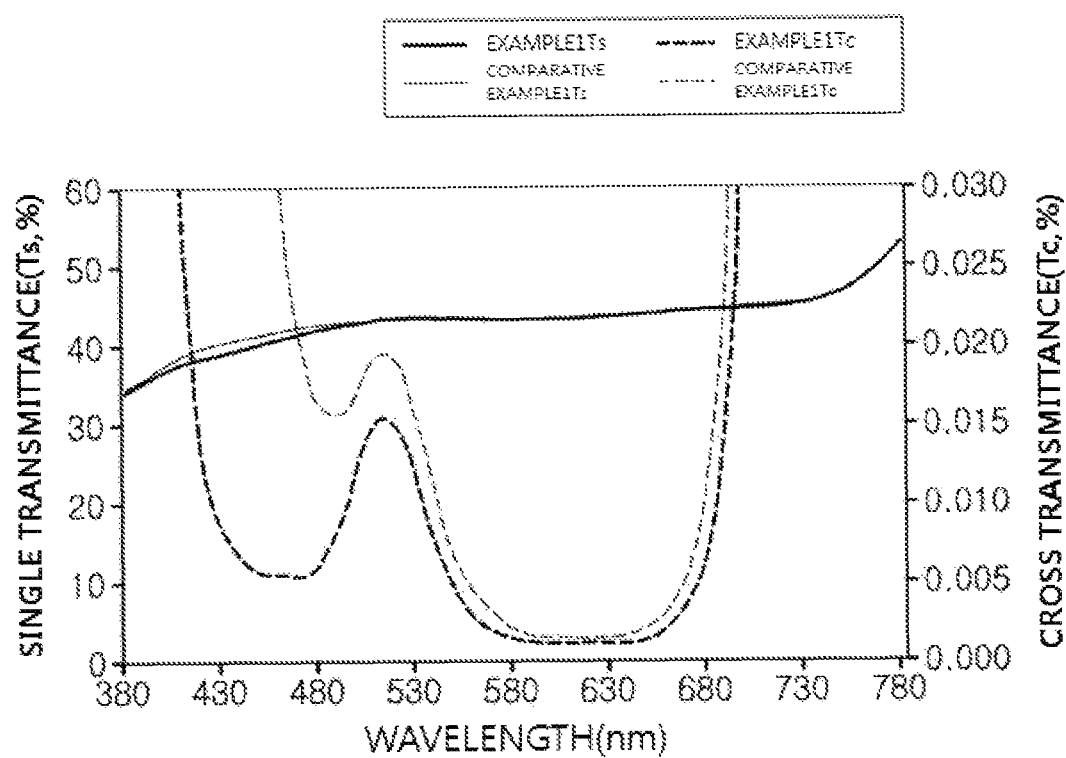

METHOD FOR MANUFACTURING POLARIZER, AND POLARIZER AND POLARIZING PLATE MANUFACTURED USING SAME

TECHNICAL FIELD

This application is a National Stage Entry of International Application No. PCT/KR2015/009878, filed Sep. 21, 2015, and claims the benefit of and priority to Korean Application No. 10-2014-0130582, filed on Sep. 29, 2014, all of which are hereby incorporated by reference in their entirety for all purposes as if fully set forth herein.

The present invention relates to a method for manufacturing a polarizer and a polarizer and a polarizing plate manufactured using the same.

BACKGROUND ART

A polarizing plate has been applied to various display devices such as a liquid crystal display device, an organic electroluminescent device, etc. A polarizing plate which is manufactured by laminating a protective film on one surface or both surfaces of a polyvinyl alcohol (hereinafter, referred to as "PVA")-based polarizer manufactured by dyeing a PVA-based film with an iodine and/or dichroic dye, cross-linking the iodine and/or dichroic dye with boric acid, and aligning the film by stretching is currently mainly used. Meanwhile, recently, applications of display devices have been widely expanded to portable devices and household large-sized TVs, and technologies for providing excellent display quality of each display device have been developed accordingly. Uniform transmittance and color of a polarizer as well as the degree of polarization are important for display quality of a display device.

Conventionally, a method of adjusting a time or temperature of immersing a PVA-based film in a processing bath has been used to adjust transmittance and color of a PVA-based polarizer. However, the method of adjusting a time and a temperature in a processing bath has a problem that if stretching conditions are modified in a stretching step, time and temperature conditions in the processing bath need to be adjusted.

Meanwhile, recently, display devices have been required to continuously increase the transmittance of a polarizing plate for the sake of energy efficiency. However, in general, if the transmittance of a polarizing plate used in a liquid crystal display device and an organic light emitting diode is increased, a light absorption area of a complex of a PVA-based film and a dichroic dye is decreased, so that the absorbance and the cross transmittance in a short wavelength or long wavelength region are considerably decreased.

Accordingly, the polarizing plate may have deterioration in polarizing performance and thermal durability and hardly maintain a neutral color, as compared with a polarizing plate with a low transmittance.

DETAILED DESCRIPTION OF THE INVENTION

Technical Problem

The present invention is conceived to solve the above-described problem. An object of the present invention is to provide a method for manufacturing a polarizer having a uniform absorbance in long wavelength and short wavelength regions of visible light and having a color close to neutral black, and a polarizer and a polarizing plate manufactured using the same.

Technical Solution

According to an exemplary embodiment of the present invention, the present invention provides a method for manufacturing a polarizer, including: a) immersing and swelling a polyvinyl alcohol-based film in an aqueous solution containing an azo-based dye having an absorption wavelength of 300 nm to 550 nm; b) dyeing the swollen polyvinyl alcohol-based film with an iodine-based dye; and c) stretching the dyed polyvinyl alcohol-based film.

Herein, preferably, the azo-based dye having an absorption wavelength of 300 nm to 550 nm may include any one or more members selected from the group consisting of chrysophenine and brilliant yellow.

Preferably, the aqueous solution containing the azo-based dye having an absorption wavelength of 300 nm to 550 nm may contain the azo-based dye in an amount of 0.001 wt % to 0.5 wt %, and may further contain alcohol.

Preferably, the iodine-based dye may include at least one member selected from the group consisting of iodine, potassium iodide, hydrogen iodide, lithium iodide, sodium iodide, zinc iodide, lithium iodide, aluminum iodide, lead iodide, copper iodide, valium iodide, calcium iodide, tin iodide, and titanium iodide.

Meanwhile, preferably, the swelling step may be performed at 10° C. to 45° C. for 5 seconds to 180 seconds. Further, preferably, the method may further include cross-linking a dye of the stretched polyvinyl alcohol-based polarizer.

Further, the present invention provides a polarizer manufactured by the manufacturing method, including a polyvinyl alcohol-based polarizer containing an iodine-based dye and an azo-based dye having an absorption wavelength of 300 nm to 550 nm, and having a single-color b value of 2 to 5 and a cross-color b value of −1 to 1.

Herein, preferably, the polarizer may have a single transmittance Ts of 40% to 50% and a cross transmittance Tc of 0.0001% to 1% in a wavelength band of 380 nm to 780 nm, and may have a cross transmittance Tc of 0.0001% to 0.5% in a wavelength band of 405 nm.

Further, preferably, the polarizer may contain an iodine-based dye in an amount of 1 wt % to 5 wt % per 19.2 $mm^3$ and an azo-based dye in an amount of 0.1 wt % to 5 wt % per 19.2 $mm^3$, and preferably, the iodine-based dye and the azo-based dye may have a weight ratio of 1:1 to 5:1.

According to yet another exemplary embodiment, the present invention provides a polarizing plate, including the polarizer; and a protective film laminated on one surface or both surfaces of the polarizer.

Advantageous Effects

According to a method for manufacturing a polarizing plate of the present invention, a polyvinyl alcohol-based film goes through a swelling step so as to contain an azo-based dye having an absorption wavelength of 300 nm to 550 nm before being dyed with an iodine-based dye. Thus, the polyvinyl alcohol-based film has a uniform cross transmission spectrum over the whole wavelength region of visible light. Accordingly, it is possible to manufacture a polarizer with excellent optical properties such as the degree of polarization, color reproduction, and the like.

In particular, it is possible to suppress a decrease in absorbance in a short wavelength region as the transmittance of a polarizing plate is increased, and thus possible to manufacture a polarizer having a neutral color.

BRIEF DESCRIPTION OF DRAWINGS

FIG. 1 is graph showing absorption spectra of polarizers manufactured according to Example 1 and Comparative Example 1 depending on a cross transmittance Tc and a single transmittance Ts in each wavelength band.

BEST MODE

Hereinafter, exemplary embodiments of the present invention will be described. However, the exemplary embodiments of the present invention can be modified in various ways and the scope of the present invention is not limited thereto. Further, the exemplary embodiments of the present invention are provided in order to more completely explain the present invention to those having average knowledge in this art.

The inventors of the present invention repeatedly conducted research in order to compensate a decrease in light absorption area of a high-transmittance polarizer with a uniform transmission spectrum over the whole wavelength region of visible light and manufacture a polarizer with excellent optical properties such as the degree of polarization, color reproduction. As a result of the research, the inventors of the present invention completed the present invention by finding that if a polarizer is manufactured by performing a swelling step using an azo-based dye having an absorption wavelength of 300 nm to 550 nm before dyeing with an iodine-based dye, it is possible to improve light absorption in a short wavelength region of visible light and thus possible to adjust a color.

A method for manufacturing a polarizer according to the present invention includes: a) immersing and swelling a polyvinyl alcohol-based film in an aqueous solution containing an azo-based dye having an absorption wavelength of 300 nm to 550 nm; b) dyeing the swollen polyvinyl alcohol-based film with an iodine-based dye; and c) stretching the dyed polyvinyl alcohol-based film.

According to the research of the inventors of the present invention, in case of bringing a decolorant-containing solution into local contact with a partial area of the polarizer as performed in the present invention, the problems of damage to the polarizer and a polarizing plate and contamination of a camera lens can be overcome, a depolarized area can be easily controlled, and polarization can be removed by a simple process, as compared with conventional physical removal methods such as punching and cutting.

Hereinafter, each step of the method for manufacturing a polarizer will be described in more detail. Firstly, a) the step of immersing and swelling a polyvinyl alcohol-based film in an aqueous solution containing an azo-based dye having an absorption wavelength of 300 nm to 550 nm may be performed by using a method for manufacturing a polyvinyl alcohol-based film known in the art or purchasing a commercially available polyvinyl alcohol-based film.

Herein, the method for manufacturing a polyvinyl alcohol-based film is not particularly limited, and may include, for example, a flow cast method of forming a film by flow-casting a polymer solution to be decomposed in water or an organic solvent, a cast method, and an extrusion method. In this case, preferably, the polyvinyl alcohol-based film may have a small in-plane retardation difference in order to obtain a polarizer with a high in-plane uniformity in the degree of polarization. Therefore, a retardation difference within the polyvinyl alcohol-based film as an unprocessed raw material film may preferably 1 nm to 100 nm, more preferably 10 nm or less, and most preferably 5 nm, at a measurement wavelength of 1000 nm.

The polyvinyl alcohol-based film may have the degree of polymerization of typically 500 to 10,000, preferably 1,000 to 6,000, and more preferably 1,400 to 4,000. Further, in case of a polyvinyl alcohol-based saponification film, the degree of saponification may be preferably 95.0 mol % or more, more preferably 99.0 mol % or more, and most preferably 99.9 mol % or more in terms of solubility.

More specifically, the swelling step is performed to improve the properties of the polarizer by immersing a non-stretched polyvinyl alcohol-based film in a swelling tank filled with an aqueous solution for swelling so as to remove impurities such as dust or an anti-blocking agent deposited on a surface of the polyvinyl alcohol-based film film and swelling the polyvinyl alcohol-based film so as to improve the stretching efficiency and suppress non-uniformity in dyeing, before dyeing the polyvinyl alcohol-based film.

Typically, water (pure water, deionized water) is used as the aqueous solution for swelling. Particularly, in the present invention, the aqueous solution containing the azo-based dye having an absorption wavelength of 300 nm to 550 nm is used.

In a conventional process for manufacturing a polyvinyl alcohol-based film, a plasticizer such as glycerin has been used. In the swelling step, all of the plasticizer is eluted in the aqueous solution for swelling. At the same time, water as the aqueous solution for swelling permeates into the place for the plasticizer. In this case, the azo-based dye having an absorption wavelength of 300 nm to 550 nm can permeate into the polyvinyl alcohol-based film together with the water.

Therefore, in the present step, the azo-based dye having an absorption wavelength of 300 nm to 550 nm permeates into the polarizer, and, thus, a decrease in absorbance of a conventional polarizer dyed only with an iodine-based dye in a short wavelength region of visible light can be compensated. Accordingly, it is possible to manufacture a polarizer which has a uniform transmission spectrum over the whole wavelength region of visible light and thus has excellent optical properties such as the degree of polarization and color reproduction and has a neutral color due to the azo-based dye.

In this case, the azo-based dye may have an absorption wavelength of preferably 300 nm to 550 nm and more preferably 350 nm to 500 nm. Herein, the absorption wavelength refers to an absorption wavelength in an aqueous solution state and has a wavelength band in a blue region. Thus, the azo-based dye refers to a dye with colors of yellow and red.

In this case, more preferably, the azo-based dye may be a stilbene dye containing a phenyl group or a naphthyl group in a molecular structure and having a double bond, and preferably, the azo-based dye may have dichroism for a favorable polarizing performance of a polarizing plate.

In this case, preferably, the azo-based dye having an absorption wavelength of 300 nm to 550 nm may include any one member selected from the group consisting of chrysophenine and brilliant yellow.

In this case, the azo-based dye having an absorption wavelength of 300 nm to 550 nm may be contained in the aqueous solution in an amount of 0.001 wt % to 0.5 wt % and preferably 0.01 wt % to 0.1 wt %. In general, the degree of absorption into the polarizer varies depending on the amount of a dye contained in the aqueous solution. If the amount of the dye satisfies the above-described range, a cross transmittance and a cross-color value are sufficiently improved, and a concentration of the dye may be adjusted within the above-described range to lower a transmittance in a short wavelength band and adjust a color.

Further, the azo-based dye may be prepared so as to have an absorption wavelength suitable for purpose by changing a functional group, and may compensate a decrease in absorbance in a short wavelength region according to a transmittance.

Meanwhile, the aqueous solution containing the azo-based dye having an absorption wavelength of 300 nm to 550 nm may further contain alcohol. The alcohol functions to promote dissolution of the azo-based dye in the aqueous solution and also facilitate deeper permeation of the azo-based dye with water into the polyvinyl alcohol-based film during permeation of the azo-based dye with water into the place where the plasticizer and other additives were eluted. Therefore, uniformity in dyeing with the dye can be further improved.

The alcohol may include one or a combination of two or more members of methanol, ethanol, n-propanol, isopropanol, n-butanol, isobutanol, sec-butanol, tert-butanol, n-amyl alcohol, isoamyl alcohol, sec-amyl alcohol, tert-amyl alcohol, 1-ethyl-1-propanol, 2-methyl-1-butanol, n-hexanol, cyclohexanol, etc., and ethanol is particularly preferable. The amount of the alcohol may be preferably 0.1 wt % to 10 wt % with respect to 100 wt % of the aqueous solution for swelling.

A temperature of the aqueous solution for swelling may be preferably 10° C. to 45° C. and more preferably 15° C. to 40° C. Further, a swelling time (an immersion time in a swelling tank) may be preferably 5 seconds to 180 seconds and more preferably 10 seconds to 100 seconds. If the swelling time is less than 5 seconds, an exchange reaction between the aqueous solution and the plasticizer does not actively occur, so that a small amount of iodine may permeate into the polyvinyl alcohol-based film, if the swelling time is more than 180 seconds, the aqueous solution excessively permeates into the polyvinyl alcohol-based film, so that the polyvinyl alcohol-based film may have wrinkles.

Then, b) the step of dyeing the swollen polyvinyl alcohol-based film with an iodine-based dye is performed. The dyeing step is performed to dye the polyvinyl alcohol-based film with an iodine-based dye. Molecules of the iodine-based dye absorb a light vibrating in an stretching direction of the polarizer and transmit a light vibrating in a vertical direction and thus makes it possible to obtain polarization in a specific vibration direction. Herein, for example, the dyeing step may be performed by immersing the polyvinyl alcohol-based film in a processing bath filled with a solution containing an iodine-based compound.

Herein, water is typically used as a solvent in the solution used for the dyeing step, and a suitable amount of an organic solvent compatible with water may be added. Meanwhile, the iodine-based dye may be used in an amount of 0.01 part by weight to 0.25 parts by weight with respect to 100 parts by weight of the solvent. This is because if the iodine-based dye is within the above-described range, the transmittance of the polarizer manufactured after stretching may satisfy the range of 40.0% to 47.0%.

Meanwhile, if iodine is used as the iodine-based dye, preferably, an adjuvant such as an iodide compound in order to improve the dyeing efficiency. The adjuvant may be used in an amount of 0.3 parts by weight to 2.5 parts by weight with respect to 100 parts by weight of the solvent. The reason for the use of the adjuvant such as an iodide compound is to increase the solubility of iodine in water since iodine has a low solubility in water. Meanwhile, preferably, the iodine and the iodide compound may have a weight mixing ratio of 1:5 to 1:10.

In this case, the iodide compound which can be added in the present invention may include potassium iodide, lithium iodide, sodium iodide, zinc iodide, aluminum iodide, lead iodide, copper iodide, valium iodide, calcium iodide, tin iodide, titanium iodide, or a mixture thereof, but is not limited thereto.

Meanwhile, a temperature of the processing bath may be maintained at 25° C. to 40° C. This is because the dyeing efficiency may be decreased at a low temperature of less than 25° C. and sublimation of a great amount of iodine occurs and the amount of iodine used may be increased at a high temperature of more than 40° C. Further, a time of immersing the polyvinyl alcohol-based film in the processing bath may be 30 seconds to 120 seconds. This is because if the immersion time is less than 30 seconds, uniform dyeing of the polyvinyl alcohol-based film may not be achieved, and if the immersion time is more than 120 seconds, dyeing may be saturated and thus the film does not need to be immersed any longer.

Meanwhile, in the solution containing the iodine-based dye of the present invention, boric acid in an amount of 0.01 wt % to 6 wt % may be further added according to necessity.

Then, c) the step of stretching the dyed polyvinyl alcohol-based film is performed.

The stretching step is performed to align iodine molecules in a predetermined direction by pulling and lengthening the polyvinyl alcohol-based film in the predetermined direction. Stretching methods can be roughly classified into wet stretching methods and dry stretching methods. The dry stretching methods are further classified into an interroll stretching method, a heating roll stretching method, a press stretching method, a tenter stretching method, etc., and the wet stretching methods are further classified into a tenter stretching method, an interroll stretching method, etc. In the present invention, the wet stretching method and the dry stretching method may all be used, and may be used in combination, if necessary.

Herein, the stretching step may be performed to stretch the polyvinyl alcohol-based film at a stretching ratio of preferably 4 times to 10 times and at a stretching temperature of preferably 45° C. to 60° C. In order to impart polarizing performance to the polyvinyl alcohol-based film, polymer chains in the polyvinyl alcohol-based film need to be aligned. At a stretching ratio of less than 4 times, chains in the polyvinyl alcohol-based film may not be sufficiently aligned, and at a stretching ratio of more than 10 times, chains in the polyvinyl alcohol-based film may be cleaved. Further, the stretching temperature may vary depending on the amount of a crosslinking agent. At a temperature of less than 45° C., the mobility of chains in the polyvinyl alcohol-based film may be be reduced, and at a temperature of more than 60° C., the polyvinyl alcohol-based film may become soft and thus may be decreased in strength. Meanwhile, the stretching step may be performed simultaneously with or separately from the dyeing step or a crosslinking step.

Meanwhile, the stretching step may be performed only to the polyvinyl alcohol-based film or may be performed to the polyvinyl alcohol-based film together with a base film after laminating the base film on the polyvinyl alcohol-based film. In the latter method, if the polyvinyl alcohol-based film having a small thickness (e.g., a PVA film of 60 μm or less) is stretched, the base film is used to suppress breakage of the polyvinyl alcohol-based film during the stretching step and thus may be used to manufacture a thin PVA polarizer of 10 μm or less. In this case, polymer films having the maximum stretching magnification of 5 times or more under a temperature of 20° C. to 85° C. may be used as the base film. For example, the base film may include a high-density polyethylene film, a polyurethane film, a polypropylene film, a polyolefin film, an ester-based film, a low-density polyethylene film, a co-extruded film of high-density polyethylene and low-density polyethylene, a copolymer resin having ethylene vinyl acetate contained in high-density polyethylene, an acrylic film, a polyethylene terephthalate film, a polyvinyl alcohol-based film, and a cellulose film. Meanwhile, the maximum stretching magnification indicates a stretching magnification immediately before the occurrence of breakage. Further, a method of laminating the base film and the polyvinyl alcohol-based film is not particularly limited. For example, the base film and the polyvinyl alcohol-based film may be laminated using an adhesive, or the polyvinyl alcohol-based film may be placed on the base film without any medium. Otherwise, the method of laminating the base film and the polyvinyl alcohol-based film may be performed by co-extruding a resin constituting the base film and a resin constituting the polyvinyl alcohol-based film, or may be performed by coating a polyvinyl alcohol-based resin on the base film. Meanwhile, after the stretching step is completed, the base film may be separated and removed from the polarizer or may not be removed and a subsequent step may be performed. In this case, the base film may be used as a protective film for the polarizer.

Meanwhile, the method for manufacturing a polarizer of the present invention may further include crosslinking a dye of the stretched polyvinyl alcohol-based polarizer.

Herein, the crosslinking step is performed to adsorb the iodine dye to a polyvinyl alcohol polymer matrix. The crosslinking step is generally performed using an immersion method in which the polyvinyl alcohol-based film is immersed in a crosslinking bath filled with an aqueous boric acid solution or the like, but is not limited thereto. It may also be performed by an application or spray method in which a solution containing a crosslinking agent is sprayed onto the polyvinyl alcohol-based film.

Herein, water is generally used as a solvent in the solution in the crosslinking bath, and a suitable amount of an organic solvent compatible with water may be added. The crosslinking agent may be added in an amount of 0.5 parts by weight to 5.0 parts by weight with respect to 100 parts by weight of the crosslinking agent. If the crosslinking agent is added in an amount of less than 0.5 parts by weight, the degree of crosslinking in the polyvinyl alcohol-based film may be insufficient, and, thus, the strength of the polyvinyl alcohol-based film in water may be reduced. If the crosslinking agent is added in an amount of more than 5.0 parts by weight, excessive crosslinking may occur, resulting in a decrease in the stretchability of the polyvinyl alcohol-based film.

Further, specific examples of the crosslinking agent include boron compounds such as boric acid or borax, glyoxal, glutaraldehyde and the like, which may be used alone or in combination.

Meanwhile, a temperature of the crosslinking bath varies depending on the amount of the crosslinking agent and the stretching ratio of the film, and is preferably between 45° C. and 60° C., but is not limited thereto. In general, as the amount of the crosslinking agent increases, the temperature of the crosslinking bath is controlled to a high temperature in order to increase the mobility of chains in the polyvinyl alcohol-based film, and as the amount of the crosslinking agent decreases, the temperature of the crosslinking bath is controlled to a relatively low temperature. However, the film is at least 5-fold stretched in the present invention. Therefore, the temperature of the crosslinking bath needs to be maintained at 45° C. or higher in order to increase the stretchability of the polyvinyl alcohol-based film. Meanwhile, the time of immersing the polyvinyl alcohol-based film in the crosslinking bath may be preferably 30 seconds to 120 seconds. This is because if the immersion time is less than 30 seconds, uniform crosslinking of the polyvinyl alcohol-based film may not be achieved, and if the immersion time is more than 120 seconds, crosslinking may be saturated and thus the film does not need to be immersed any longer.

Meanwhile, the present invention provides a polarizer manufactured by the above-described method.

Herein, the polyvinyl alcohol-based polarizer of the present invention includes a polyvinyl alcohol-based polarizer containing an iodine-based dye and an azo-based dye having an absorption wavelength of 300 nm to 550 nm, and has a single-color b value of 2 to 5 and a cross-color b value of −1 to 1.

More specifically, the term "single color" refers to a color obtained when natural light is irradiated to a single polarizing plate, and the term "cross color" refers to a color obtained when natural light is irradiated to two polarizing plates laminated on each other in such a manner that the absorption axes thereof cross each other at a right angle.

Also, the color "b" refer to a color value that is expressed in the CIE coordinate system. More specifically, the color "b" value is calculated according to $b=200[(Y/Y_n)^{1/3}-(Z/Z_n)^{1/3}]$. "+b" means yellow, and "−b" means blue (Herein, $X_n$, $Y_n$ and $Z_n$ correspond to X, Y and Z of white serving as a standard, respectively).

That is, the single-color "b" value means the color "b" value in the CIE coordinate system, obtained by measuring a single polarizer color using a color difference meter, and the cross-color "b" value means the color "b" value in the CIE coordinate system, obtained by measuring colors of a pair of polarizers, arranged such that the absorption axes thereof cross each other, using a color difference meter.

Specifically, the single-color "b" value is in the range of preferably 2 to 5 and more preferably 3 to 4.6. If the single-color "b" value of polarizers arranged to cross each other is less than 2, the color may be bluish, and if the single-color "b" value is more than 5, the color may be yellowish, and thus it may be difficult to realize natural black, and a contrast ratio (CR) value may be reduced.

Meanwhile, the cross-color "b" value may be preferably closer to 0 in order to realize natural black, and more preferably, it may be −1 to 1 or −1 to 0.

The degree of polarization (DOP) of the polarizing plate manufactured by the manufacturing method of the present invention may be 99.9% or higher, and preferably, for example, 99.98% or higher. Meanwhile, the degree of polarization (DOP) is defined as the following equation 1 by the parallel transmittance Tp obtained for two polarizing plates, arranged such that the absorption axes thereof are parallel to each other, and the cross transmittance Tc obtained for two polarizing plates arranged such that the absorption axes thereof cross each other at an angle of 90°.

[Equation 1]

Degree of polarization=$[(Tp-Tc)/(Tp+Tc)]^{1/2}$

Meanwhile, a single transmittance Ts of the polarizer of the present invention may be preferably 40% to 50% and more preferably 41% to 47%. A cross transmittance Tc in a wavelength band of 380 nm to 780 nm obtained for polarizers overlapped such that the absorption axes thereof cross each other at an angle of 90° may be preferably 1% or less, more preferably 0.30% or less, and most preferably 0.20% or less. Since the polarizer of the present invention has a uniform cross transmission spectrum over the whole wavelength region of visible light, a cross transmittance measured at 550 nm may be 0.0001% to 0.1% or more preferably 0.0001% to 0.01%. In addition, a cross transmittance measured at 405 nm may be preferably 0.0001% to 0.5% and more preferably 0.0001% to 0.2% or 0.0001% to 0.1%.

Meanwhile, the content of the iodine-based dye in the polarizer may be 1 wt % to 5 wt % and preferably 2 wt % to 4 wt % per 19.2 mm$^3$. Further, the content of the azo-based dye may be 0.1 wt % to 5 wt % and preferably 0.5 wt % to 3.5 wt % per 19.2 mm$^3$.

Herein, the content of the iodine-based dye or the azo-based dye was measured using a fluorescent X-ray analyzer ZSX100-e (manufactured by Rigaku Corporation).

Further, in the polarizer, the iodine-based dye and the azo-based dye may have a weight ratio of preferably 1:1 to 5:1 and more preferably 3:2 to 4:1. If the iodine-based dye and the azo-based dye have the weight ratio of 1:1 or less, excessive absorption of short wavelength occurs, so that the color of the polarizer may turn to red. If the weight ratio is 5:1 or more, the degree of color change caused by the dyes is small, so that the color turns to blue at a high transmittance.

Further, the present invention provides a polarizing plate including a protective film laminated on one surface or both surfaces of the polarizer.

The term "protective film" refers to a transparent film that is attached to both sides of the polarizer in order to protect the polarizer. The protective film may be an acetate-based resin film such as a triacetyl cellulose (TAC) film, an acryl-based resin film, a polyester-based resin film, a polyethersulfone-based resin film, a polycarbonate-based resin film, a polyamide-based resin film, a polyimide-based resin film, or a polyolefin-based resin film, but is not limited thereto.

Herein, the protective film may be laminated using an adhesive. The adhesive may be a polyvinyl alcohol-based aqueous adhesive, but is not limited thereto. In addition to the protective film, the polarizing plate may additionally include a functional film such as a wide-viewing angle compensating plate or a brightness enhancing film in order to improve additional functions.

Meanwhile, the polarizing plate of the present invention as described above can be advantageously applied to image display devices by attaching it to one or both sides of display panels. The display panels may be a liquid crystal panel, a plasma panel and an organic light-emitting panel. Thus, the image display devices may be a liquid crystal display (LCD), a plasma display panel (PDP), and an organic light emitting diode (OLED).

More specifically, the image display device may be a liquid crystal display including: a liquid crystal panel; and polarizing plates provided on both sides of the liquid crystal panel, respectively. In this case, at least one of the polarizing plates may be the polarizing plate including the polarizer of the present invention. That is, the polarizing plate includes a polyvinyl alcohol-based polarizer dyed with iodine or a dichroic dye and locally has a depolarized area with a single transmittance of 90% or more.

Herein, the kind of a liquid crystal panel included in the liquid crystal display is not particularly limited. Examples of the liquid crystal panel may include, but are not limited to, all known panels, including: passive matrix panels such as twisted nematic (TN) panels, super twisted nematic (STN) panels, ferroelectric (F) or polymer dispersed (PD) panels; active matrix panels such as two-terminal type panels or three-terminal type panels; in-plane switching (IPS) panels; and vertical alignment (VA) panels, etc. In addition, the kinds of other components of the liquid crystal display, for example, upper and lower substrates (e.g., a color filter substrate or an array substrate), are not particularly limited, and those known in the art may be used without limitation.

[Mode]

Hereinafter, the present invention will be described in further detail with reference to examples. However, the following examples are provided for better understanding of the present invention and are not intended to limit the scope of the present invention.

Example 1

A polyvinyl alcohol-based film (Kuraray Co., Ltd.; PS60) was subjected to a swelling process in an aqueous solution containing 0.05 wt % of chrysophenine (Taoka Co., Ltd.) at 20° C. for 60 seconds, and then subjected to a dyeing process in a 0.06 wt % iodine solution at 25° C. for 60 seconds. Then, the film was subjected to a cleaning process in a 0.5 wt % boric acid solution at 35° C. for 60 seconds, and then was 6-fold stretched in a 3.5 wt % boric acid solution at 60° C. Then, the film was dried in an oven at 80° C. for 1 minute, thereby manufacturing a polyvinyl alcohol-based polarizer having a thickness of 23 μm.

Example 2

A polyvinyl alcohol-based polarizer was manufactured by the same method as Example 1 except a swelling process in an aqueous solution containing 0.02 wt % of chrysophenine.

Example 3

A polyvinyl alcohol-based polarizer was manufactured by the same method as Example 1 except a swelling process in an aqueous solution containing 0.10 wt % of chrysophenine.

Example 4

A polyvinyl alcohol-based polarizer was manufactured by the same method as Example 1 except a swelling process in an aqueous solution containing 0.05 wt % of brilliant yellow (Henan Tianfu Chemical Co., Ltd.) instead of the aqueous solution containing 0.05 wt % of chrysophenine.

Comparative Example 1

A polyvinyl alcohol-based polarizer was manufactured by the same method as Example 1 except a swelling process using ultrapure water instead of chrysophenine.

Comparative Example 2

A polyvinyl alcohol-based film (Kuraray Co., Ltd.; PS60) was subjected to a swelling process in a pure water solution at 20° C. for 60 seconds, and then subjected to a dyeing process in a 0.06 wt % iodine solution at 25° C. for 60 seconds. Then, the film was subjected to a cleaning process in a 0.5 wt % boric acid solution containing 0.05 wt % of chrysophenine at 35° C. for 60 seconds, and then was 6-fold stretched in a 3.5 wt % boric acid solution at 60° C. Then, the film was dried in an oven at 80° C. for 1 minute, thereby manufacturing a polyvinyl alcohol-based polarizer having a thickness of 23 μm.

Test Example 1—Evaluation of Optical Properties of Polarizer

Each of the polarizers manufactured in Examples 1 to 4 and Comparative Examples 1 and 2 was cut to a size of 40 mm×40 mm. Each of the cut samples was fixed to a measurement holder, and then measured for its single transmittance, cross transmittance, and degree of polarization in a wavelength range of 405 nm to 550 nm using a UV-Vis spectrophotometer (V-7100, manufactured by JASCO Co., Ltd.). The results of the measurement were as shown in Table 1.

Further, the absorption spectra of Example 1 and Comparative Example 1 for a single transmittance and a cross transmittance in a wavelength range of 380 nm to 780 nm were as shown in FIG. 1.

Test Example 2—Evaluation of Content of Iodine and Azo-Based Dye in Polarizer

In the polarizer, the contents of the iodine-based dye and the dichroic dye were measured using a fluorescent X-ray analyzer ZSX100-e (manufactured by Rigaku Corporation). Herein, 4 sheets of each sample manufactured in the form of polarizer sheet having a thickness of 23 μm according to Examples and Comparative Examples were overlapped with each other and then fixed to a 20 mm holder. Then, the intensity of fluorescence was measured. The average wt % per volume of 19.2 $mm^3$ as a result of the measurement carried out three times in total was as shown in Table 1 below.

TABLE 1

| | Kind of azo-based dye | Concentration of azo-based dye aqueous solution (wt %) | Content of iodine dye (wt %) | Content of azo-based dye (wt %) | Optical properties in 550 nm region | | Optical properties in 405 nm region | | Single-color b value | Cross-color b value |
|---|---|---|---|---|---|---|---|---|---|---|
| | | | | | Single transmittance (%) | Cross transmittance (%) | Single transmittance (%) | Cross transmittance (%) | | |
| Example 1 | Chrysophenine | 0.05 | 2.64 | 1.24 | 43.56 | 0.0044 | 37.45 | 0.0393 | 2.9 | −0.1 |
| Example 2 | Chrysophenine | 0.02 | 2.70 | 0.82 | 43.51 | 0.0044 | 38.10 | 0.0926 | 2.3 | −0.9 |
| Example 3 | Chrysophenine | 0.10 | 2.52 | 1.99 | 43.62 | 0.0064 | 36.55 | 0.0242 | 3.8 | 0.2 |
| Example 4 | Brilliant yellow | 0.05 | 2.69 | 1.58 | 43.51 | 0.0057 | 37.58 | 0.0448 | 2.7 | −0.2 |
| Comparative Example 1 | — | — | 2.79 | — | 43.50 | 0.0061 | 38.98 | 0.2017 | 1.6 | −3.3 |
| Comparative Example 2 | Chrysophenine | 0.05 | 2.31 | 3.27 | 43.67 | 0.0157 | 33.84 | 0.0009 | 6.0 | 0.6 |

As can be seen from Table 1 above, the polarizers of Examples 1 to 4 had a cross transmittance of 0.0100% or less in a 405 nm region with an excellent absorbance in a short wavelength region, as compared with Comparative Example 1. Thus, it can be seen that the polarizers had a color close to natural black. In addition, it can be confirmed that the polarizers had excellent color properties as compared with Comparative Example 2 using the azo-based dye after the dyeing process.

Although the examples of the present invention have been described in detail, the right scope of the present invention is not limited thereto. It is obvious for a person having ordinary skill in the art that various modifications and changes can be made, without departing from the scope and spirit of the present invention as disclosed in the accompanying claims.

The invention claimed is:

1. A method for manufacturing a polarizer, the method comprising:
    a) immersing and swelling a polyvinyl alcohol-based film in an aqueous solution containing an azo-based dye having an absorption wavelength of 300 nm to 550 nm;
    b) dyeing the swollen polyvinyl alcohol-based film with an iodine-based dye; and
    c) stretching the dyed polyvinyl alcohol-based film,
    wherein the azo-based dye having an absorption wavelength of 300 nm to 550 nm includes any one or more members selected from the group consisting of chrysophenine and brilliant yellow, and
    wherein the aqueous solution containing the azo-based dye having an absorption wavelength of 300 nm to 550 nm contains the azo-based dye in an amount of 0.001 wt % to 0.5 wt %.

2. The method for manufacturing a polarizer of claim 1, wherein the aqueous solution containing the azo-based dye having an absorption wavelength of 300 nm to 550 nm further contains alcohol.

3. The method for manufacturing a polarizer of claim 1, wherein the iodine-based dye includes at least one member selected from the group consisting of iodine, potassium iodide, hydrogen iodide, lithium iodide, sodium iodide, zinc iodide, lithium iodide, aluminum iodide, lead iodide, copper iodide, valium iodide, calcium iodide, tin iodide, and titanium iodide.

4. The method for manufacturing a polarizer of claim 1, wherein the swelling step is performed at 10° C. to 45° C. for 5 seconds to 180 seconds.

5. The method for manufacturing a polarizer of claim 1, further comprising:
    crosslinking a dye of the stretched polyvinyl alcohol-based polarizer.

6. A polarizer manufactured by the method of claim 1 comprising:
    a polyvinyl alcohol-based polarizer containing an azo-based dye having an absorption wavelength of 300 nm to 550 nm,
    wherein the polarizer has a single-color b value of 2 to 5 and a cross-color b value of −1 to 1.

7. The polarizer of claim 6, wherein the polarizer has a single transmittance Ts of 40% to 50% in a wavelength band of 380 nm to 780 nm.

8. The polarizer of claim 6, wherein the polarizer has a cross transmittance Tc of 0.0001% to 1% in a wavelength band of 380 nm to 780 nm.

9. The polarizer of claim 6, wherein the polarizer has a cross transmittance Tc of 0.0001% to 0.5% in a wavelength band of 405 nm.

10. The polarizer of claim 6, wherein the polarizer contains an iodine-based dye in an amount of 1 wt % to 5 wt % per 19.2 mm$^3$ and an azo-based dye in an amount of 0.1 wt % to 5 wt % per 19.2 mm$^3$.

11. The polarizer of claim 6, wherein in the polarizer, the iodine-based dye and the azo-based dye have a weight ratio of 1:1 to 5:1.

12. A polarizing plate, comprising:
   the polarizer of claim 6; and
   a protective film laminated on one surface or both surfaces of the polarizer.

* * * * *